Patented Mar. 1, 1932

1,847,974

UNITED STATES PATENT OFFICE

HAROLD A. MORTON, OF AKRON, OHIO

AGE RESISTING PROCESS FOR RUBBER AND AGE RESISTING RUBBER COMPOUND

No Drawing. Application filed July 23, 1930. Serial No. 470,225.

My invention relates to rubber or rubber-like compounds and more particularly to those having incorporated therein, or applied thereto, an anti-oxidant, whereby the aging quality of the compound is materially enhanced, and to a process for retarding the aging of such compounds.

I have discovered that organic chemical ring compounds having the basic constitution of

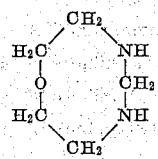

when incorporated into a rubber or rubber-like compound prior to the vulcanization thereof, or when applied to a vulcanized article, materially retard deterioration due to oxidation.

There are a great number of such compounds which function as anti-oxidants and in general they may be represented by the following general chemical constitution:

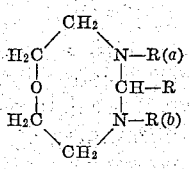

In the above representation of the constitutional formula, the chemical radicals represented by R(a) and R(b) may be any of the following chemical groups or their equivalent: H, $CH_3$, $CH_3CH_2$, $CH_3CH_2$, $CH_2$, $(CH_3)_2CH$, $CH_3CH_2CH_2CH_2$, $(CH_3)_2CH-CH_2$, $CH_3\ CH_2CH_2CH_2CH_2$, $(CH_3)_2CH\cdot CH_2$ $CH_2$, $C_6H_4CH_3$, $C_6H_5$, $C_6H_3(CH_3)_2$, $C_6H_5$ $CH_2$, $C_6H_4NH_2$, $C_6H_3(CH_3)NH_2$, $C_6H_4OH$, $C_{10}H_7$.

The chemical radical represented by R may be any of the following chemical groups or their equivalents: H, $CH_3$, $CH_3CH_2$, $CH_3CH_2CH_2$, $(CH_3)_2CH$, $CH_3\ CH_2CH_2$ $CH_2$, $(CH_3)_2CH\ CH_2$, $CH_3CH_2CH_2CH_2CH_2$, $(CH_3)_2CH.CH_2CH_2$, $C_6H_5$, $C_6H_4CH_3$, $C_6H_3$ $(CH_3)_2$, $C_6H_5CH_2$, $CH_2CH=CH$, $CH_2=CH$, $CH_3CH_2CH_2CH=C(C_2H_5)$, $C_4H_3O$, $CH_3CH_2CH_2CH_2CH_2CH_2$, or in general any aliphatic, aromatic or mixed aliphatic-aromatic groups, whether saturated or unsaturated.

One method of forming such ring compounds consists in reacting BB' di (aryl amino) ethyl ethers, sometimes termed BB' di (aryl amino) (bethoxy) ethanes with aldehydes. When this method of preparation is employed the formation may be indicated by the following representation:

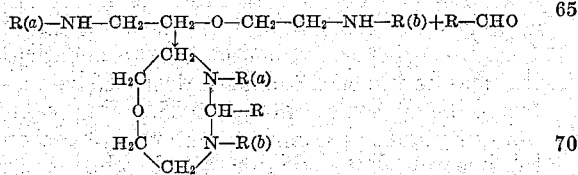

Other methods of preparation may be employed, the specific ring formation possessing antioxidant properties not dependent upon the particular method of formation.

One of the typical members of this class of materials is, for simplicity, denoted as methylene BB' di (phenyl amino) ethyl ether, the probable formula being:

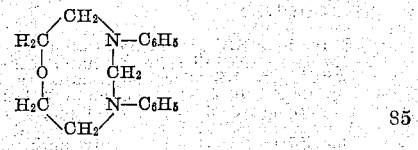

For many purposes, this material may be prepared by the reaction of formaldehyde on the crude product obtained by heating aniline and BB' dichlor ethyl ether, and which contains in addition to BB' di (phenyl amino) ethyl ether, a certain quantity of N-phenyl morpholine and other products. When this method is employed the material may be prepared in the following manner:—

Aniline (372 pounds) is heated with BB' dichlor ethyl ether (143 pounds) at a temperature of approximately 200° centigrade until reaction is complete. The reaction product is then treated with a relatively large quantity of hot water to extract the aniline hydrochloride content. The residual oil, amounting to about 200 pounds is then treated with approximately 60 pounds of 40% formaldehyde solution. Due to the reaction being exothermic, considerable heat is evolved. The contents of the vessel are then heated at 100° centigrade for about three hours to carry the reaction to completion. After separation of the water and cooling, the reaction product solidifies to a soft solid. It is then ready for use.

While in the above example, I have given the preferred method of manufacture, it is also possible to obtain valuable products by using different ratios of BB' dichlor ethyl ether and aniline. In other words, it is possible to use only two or three mols of aniline per mol of BB' dichlor ethyl ether and it is also possible to use considerably lower temperatures of reaction.

If desired, the product obtained by heating aniline and BB' dichlor ethyl ether may be purified by eliminating morpholine derivatives prior to the reaction with formaldehyde.

Other similar materials, herein referred to, may be prepared in like manner.

While it is considered that the above reactions take place in the manner indicated, I do not wish to be bound by the chemical theories herein contained but desire to be protected by Letters Patent on the ring compounds obtained from the material prepared by heating BB' dichlor ethyl ether with amines and by the "material prepared" I mean the semi-purified product containing several ingredients or the purified product from which some of the by-products, such as morpholine derivatives have been removed.

The ring formation is a complex one and for the sake of simplicity the typical antioxidants belonging to this class and prepared in the manner above indicated are denoted as follows:

Ethylidene BB' di (phenyl amino) ethyl ether
Butylidene BB' di (phenyl amino) ethyl ether
Benzylidene BB' di (phenyl amino) ethyl ether
Furfur BB' di (phenyl amino) ethyl ether
Methylene BB' di (ortho tolyl amino) ethyl ether
Ethylidene BB' di (ortho tolyl amino) ethyl ether
Butylidene BB' di (ortho tolyl amino) ethyl ether
Benzylidene BB' di (ortho tolyl amino) ethyl ether
Furfur BB' di (ortho tolyl amino) ethyl ether
Crotylidene BB' di (ortho tolyl amino) ethyl ether
Methylene BB' di (para tolyl amino) ethyl ether
Butylidene BB' di (para tolyl amino) ethyl ether
Ethylidene BB' di (para tolyl amino) ethyl ether
Furfur BB' di (para tolyl amino) ethyl ether
Benzylidene BB' di (para tolyl amino) ethyl ether
Methylene BB' di (xylyl amino) ethyl ether
Ethylidene BB' di (xylyl amino) ethyl ether
Butylidene BB' di (xylyl amino) ethyl ether
Benzylidene BB' di (xylyl amino) ethyl ether
Furfur BB' di (xylyl amino) ethyl ether
Methylene BB' di (alpha naphthyl amino) ethyl ether
Ethylidene BB' di (alpha naphthyl amino) ethyl ether
Butylidene BB' di (alpha naphthyl amino) ethyl ether
Benzylidene BB' di (alpha naphthyl amino) ethyl ether
Furfur BB' di (alpha naphthyl amino) ethyl ether
Methylene BB' diamino ethyl ether
Ethylidene BB' diamino ethyl ether
Butylidene BB' diamino ethyl ether
Benzylidene BB' diamino ethyl ether
Furfur BB' diamino ethyl ether
Methylene BB' di (beta naphthyl amino) ethyl ether
Ethylidene BB' di (beta naphthyl amino) ethyl ether
Butylidene BB' di (beta naphthyl amino) ethyl ether
Benzylidene BB' di (beta naphthyl amino) ethyl ether
Furfur BB' di (beta naphthyl amino) ethyl ether
Heptylidene BB' di (beta naphthyl amino) ethyl ether
Methylene BB' di (methyl amino) ethyl ether
Ethylidene BB' di (methyl amino) ethyl ether
Butylidene BB' di (methyl amino) ethyl ether
Benzylidene BB' di (methyl amino) ethyl ether
Furfur BB' di (methyl amino) ethyl ether
Crotylidene BB' di (methyl amino) ethyl ether
Methylene B (phenyl amino) B' (ortho tolyl amino) ethyl ether
Crotylidene B (phenyl amino) B' (ortho tolyl amino) ethyl ether
Ethylidene B (phenyl amino) B' (ortho tolyl amino) ethyl ether
Butylidene B (phenyl amino) B' (ortho tolyl amino) ethyl ether
Benzylidene B (phenyl amino) B' (ortho tolyl amino) ethyl ether
Methylene BB' di (ethyl amino) ethyl ether
Heptylidene BB' di (ethyl amino) ethyl ether
Crotylidene BB' di (ethyl amino) ethyl ether
Ethylidene BB' di (ethyl amino) ethyl ether
Benzylidene BB' di (ethyl amino) ethyl ether
Methylene B (xylyl amino) B' amino ethyl ether
Butylidene B (xylyl amino) B' amino ethyl ether
Crotylidene B (xylyl amino) B' amino ethyl ether
Ethylidene B (xylyl amino) B' amino ethyl ether
Benzylidene B (xylyl amino) B' amino ethyl ether
Heptylidene B (xylyl amino) B' amino ethyl ether
Methylene B (phenyl amino) B' (methyl amino) ethyl ether
Crotylidene B (phenyl amino) B' (methyl amino) ethyl ether
Butylidene B (phenyl amino) B' (ethyl amino) ethyl ether
Ethylidene B (phenyl amino) B' (methyl amino) ethyl ether
Benzylidene B (phenyl amino) B' (methyl amino) ethyl ether
Heptylidene B (phenyl amino) B' (methyl amino) ethyl ether The above materials are only indicative of the wide range of compounds which function in carrying out this invention.

While the materials cited above are the free bases it is also possible to use salts or soaps of these materials formed from weak acids, without materially affecting the anti-oxidant value.

As examples of carrying out the invention the following are typical:

In all of the following examples, "tensil" means tensile strength at break in pounds per square inch; "elongation" or "elong" means elongation at break in percent; and the cure is given in minutes at pounds steam pressure per square inch.

*Example 1*

The use of methylene di (phenyl amino) ethyl ether in a rubber stock accelerated with diphenyl guanidine is illustrated in this example. The test was carried out on the formaldehyde reaction product obtained from the crude product prepared by heating BB' dichlor ethyl ether (1 mol) with aniline (4 mols) and removing the aniline hydrochloride. The composition of the rubber stock is as follows:—

| | |
|---|---|
| Rubber | 56.35 |
| Stearic acid | 1.00 |
| Carbon black | 25.00 |
| Oil | 5.00 |
| Zinc oxide | 10.00 |
| Sulphur | 2.25 |
| Diphenyl guanidine | 0.40 |
| | 100.00 |

Two stocks were mixed, one exactly like the recipe, and the other the same except for the addition of 1.5% of the antioxidant.

After vulcanization, the two rubber stocks were tested for aging qualities by the usual hot oven and oxygen bomb methods.

The results are as follows:

| Days in oven at 70° C. | Compound -A- | | Compound -B- | |
|---|---|---|---|---|
| | Without tensil | Antioxidant elongation | 1.5% tensil | Antioxidant elongation |
| CURE 50' x 40# | | | | |
| Original | 3670 | 690 | 3840 | 690 |
| 2 days | 3895 | 610 | 4040 | 680 |
| 7 days | 2630 | 620 | 3450 | 680 |
| 10 days | 2200 | 600 | 3355 | 650 |
| 14 days | 1545 | 500 | 2910 | 630 |
| 21 days | 1230 | 410 | 2690 | 570 |
| Oxygen bomb 48 hrs. x 70° C. x 300 lbs | 640 | 460 | 1870 | 580 |
| CURE 70' x 40# | | | | |
| Original | 3895 | 650 | 3880 | 650 |
| 2 days | 3830 | 600 | 4175 | 640 |
| 7 days | 2625 | 570 | 3645 | 630 |
| 10 days | 2210 | 550 | 2960 | 560 |
| 14 days | 1565 | 430 | 2840 | 570 |
| 21 days | 1370 | 350 | 2370 | 500 |
| Oxygen bomb 48 hrs. x 70° C. x 300 lbs | 475 | 500 | 1750 | 530 |
| CURE 90' x 40# | | | | |
| Original | 3660 | 650 | 3920 | 650 |
| 2 days | 3660 | 580 | 3760 | 600 |
| 7 days | 2590 | 530 | 3555 | 590 |
| 10 days | 2070 | 500 | 3100 | 550 |
| 14 days | 1635 | 420 | 2490 | 470 |
| 21 days | 1185 | 250 | 2370 | 440 |
| Oxygen bomb 48 hrs. x 70° C. x 300 lbs | 490 | 360 | 1560 | 460 |

*Example 2*

In this example the use of various materials having the above ring constitution is illustrated. The materials employed as anti-oxidants are as follows:—

(A) Ethylidene di (phenyl amino) ethyl ether. Probable formula is:

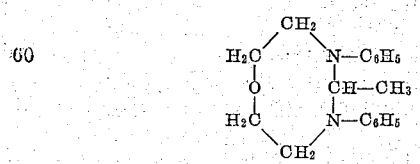

Prepared by reacting acetaldehyde with the reaction product of BB' dichlor ethyl ether and aniline.

(B) Methylene di (alpha naphthyl amino) ethyl ether. Probable formula is:

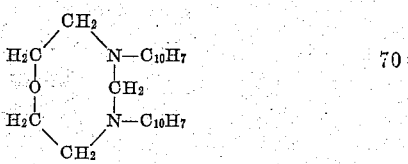

Prepared by reacting formaldehyde with the reaction product of BB' dichlor ethyl ether and alpha naphthyl amine.

(C) Benzylidene di (para tolyl amino) ethyl ether. Probable formula is:

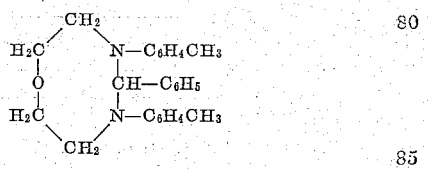

Prepared by reacting benzaldehyde with the reaction product of BB' dichlor ethyl ether and para toluidine.

(D) Butylidene di (phenyl amino) ethyl ether. Probable formula is:

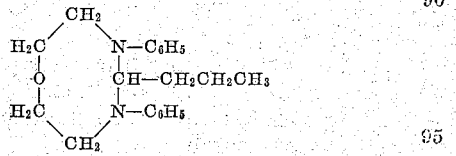

(E) Benzylidene di (alpha naphthyl amino) ethyl ether. Probable formula is:

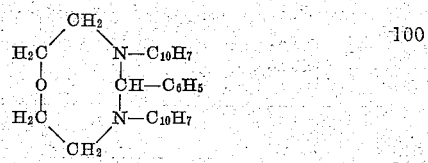

Prepared by reacting benzaldehyde with the reaction product of BB' dichlor ethyl ether and alpha naphthyl amine.

(F) Butylidene di (alpha naphthyl amino) ethyl ether. Probable formula is:

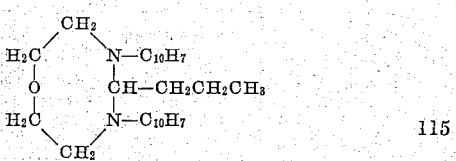

Prepared by reacting butyl aldehyde with the reaction product of BB' dichlor ethyl ether and alpha naphthyl amine.

(G) Benzylidene di (phenyl amino) ethyl ether. Probable formula is:

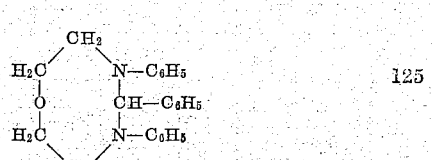

Prepared by reacting benzaldehyde with the reaction product of BB' dichlor ethyl ether and aniline.

(H) Ethylidene di (alpha naphthyl amino) ethyl ether. Probable formula is:

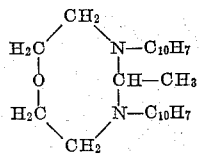

Prepared by reacting acetaldehyde with the reaction product of BB' dichlor ethyl ether and alpha naphthyl amine.

The above antioxidants were mixed into a stock having the following composition:

| | |
|---|---:|
| Rubber | 55.35 |
| Stearic acid | 2.00 |
| Carbon black | 20.00 |
| Oil | 5.00 |
| Zinc oxide | 15.00 |
| Sulphur | 2.25 |
| Diphenyl guanidine | 0.40 |
| | 100.00 |

The stocks, containing the antioxidants listed above, were mixed from the above base recipe and the quantity of antioxidant used was, in each case, 1.25%.

After calendering into sheets $\frac{1}{16}$ inch in thickness they were vulcanized over a range of cures and subjected to the usual hot oven and oxygen bomb age tests.

The oven age test was made at a temperature of 70° centigrade and the oxygen bomb test was made at 70° centigrade and 300 pounds per square inch oxygen pressure for 48 hours. The results are given in the following tables:—

| Days in oven | Control | | | | | |
|---|---|---|---|---|---|---|
| | No antioxidant | | Antioxidant A | | Antioxidant B | |
| | Tensil | Elongation | Tensil | Elongation | Tensil | Elongation |
| CURE 50' x 40# | | | | | | |
| Original | 3620 | 700 | 3805 | 650 | 3690 | 620 |
| 2 days | 3505 | 660 | 3620 | 600 | 3460 | 600 |
| 7 days | 2940 | 640 | 3300 | 600 | 3320 | 600 |
| 10 days | 2460 | 580 | 3120 | 600 | 3160 | 570 |
| 14 days | 1930 | 540 | 2960 | 600 | 2775 | 550 |
| 21 days | 1450 | 520 | 2570 | 550 | 2340 | 500 |
| Oxygen bomb | 730 | 430 | 2120 | 610 | 1905 | 570 |
| CURE 70' x 40# | | | | | | |
| Original | 3450 | 670 | 3760 | 620 | 3540 | 600 |
| 2 days | 3540 | 600 | 3685 | 600 | 3740 | 580 |
| 7 days | 2630 | 580 | 3180 | 570 | 3095 | 520 |
| 10 days | 2190 | 530 | 2970 | 550 | 2920 | 500 |
| 14 days | 1865 | 470 | 2800 | 520 | 2700 | 460 |
| 21 days | 1205 | 340 | 2380 | 460 | 2015 | 410 |
| Oxygen bomb | 670 | 340 | 1890 | 530 | 1700 | 490 |
| CURE 90' x 40# | | | | | | |
| Original | 3680 | 630 | 3640 | 580 | 3560 | 580 |
| 2 days | 3300 | 600 | 3310 | 550 | 3230 | 530 |
| 7 days | 2540 | 540 | 3120 | 520 | 2840 | 450 |
| 10 days | 1880 | 470 | 2870 | 500 | 2520 | 420 |
| 14 days | 1510 | 400 | 2630 | 450 | 2230 | 400 |
| 21 days | 1000 | 270 | 2020 | 340 | 1770 | 300 |
| Oxygen bomb | 515 | 380 | 1830 | 500 | 1640 | 450 |

| Days in oven | Antioxidant C | | Antioxidant D | | Antioxidant E | |
|---|---|---|---|---|---|---|
| | Tensil | Elongation | Tensil | Elongation | Tensil | Elongation |
| CURE 50' x 40# | | | | | | |
| Original | 3680 | 640 | 3675 | 670 | 3780 | 660 |
| 2 days | 3590 | 620 | 3380 | 630 | 3575 | 620 |
| 7 days | 3460 | 620 | 3370 | 640 | 3380 | 610 |
| 10 days | 3075 | 600 | 3180 | 620 | 3180 | 610 |
| 14 days | 3000 | 600 | 2805 | 630 | 2880 | 600 |
| 21 days | 2510 | 560 | 2565 | 600 | 2560 | 550 |
| Oxygen bomb | 2140 | 600 | 1900 | 600 | 1990 | 600 |
| CURE 70' x 40# | | | | | | |
| Original | 3760 | 600 | 3860 | 660 | 3840 | 640 |
| 2 days | 3490 | 590 | 3320 | 600 | 3480 | 600 |
| 7 days | 3370 | 600 | 3375 | 620 | 3160 | 550 |
| 10 days | 3120 | 570 | 2820 | 570 | 2930 | 520 |
| 14 days | 2900 | 530 | 2805 | 590 | 2705 | 520 |
| 21 days | 2460 | 480 | 2360 | 530 | 2220 | 440 |
| Oxygen bomb | 1990 | 540 | 1810 | 590 | 1810 | 540 |
| CURE 90' x 40# | | | | | | |
| Original | 3800 | 600 | 3790 | 650 | 3870 | 610 |
| 2 days | 3395 | 570 | 3480 | 590 | 3400 | 550 |
| 7 days | 3100 | 540 | 3320 | 580 | 3430 | 510 |
| 10 days | 2960 | 510 | 3020 | 540 | 2880 | 470 |
| 14 days | 2740 | 480 | 2665 | 520 | 2640 | 450 |
| 21 days | 2320 | 400 | 2320 | 450 | 2060 | 350 |
| Oxygen bomb | 1810 | 490 | 1780 | 550 | 1710 | 480 |

| Days in oven | Antioxidant F | | Antioxidant G | | Antioxidant H | |
|---|---|---|---|---|---|---|
| | Tensil | Elongation | Tensil | Elongation | Tensil | Elongation |
| CURE 50' x 40# | | | | | | |
| Original | 3720 | 650 | 3815 | 640 | 3830 | 630 |
| 2 days | 3500 | 640 | 3625 | 630 | 3720 | 620 |
| 7 days | 3540 | 630 | 3410 | 630 | 3520 | 610 |
| 10 days | 3305 | 590 | 3170 | 620 | 3375 | 590 |
| 14 days | 3060 | 600 | 2815 | 610 | 3125 | 600 |
| 21 days | 2860 | 560 | 2420 | 660 | 2560 | 530 |
| Oxygen bomb | 2195 | 600 | 2030 | 620 | 2120 | 600 |
| CURE 70' x 40# | | | | | | |
| Original | 3580 | 630 | 3820 | 640 | 3705 | 600 |
| 2 days | 3480 | 600 | 3520 | 600 | 3360 | 580 |
| 7 days | 3360 | 580 | 3340 | 570 | 3380 | 550 |
| 10 days | 3190 | 540 | 2880 | 580 | 3175 | 520 |
| 14 days | 2920 | 510 | 2580 | 520 | 2685 | 480 |
| 21 days | 2610 | 480 | 2240 | 460 | 2470 | 440 |
| Oxygen bomb | 2030 | 550 | 1835 | 560 | 2070 | 540 |
| CURE 90' x 40# | | | | | | |
| Original | 3640 | 600 | 3680 | 600 | 3540 | 600 |
| 2 days | 3395 | 550 | 3500 | 570 | 3405 | 530 |
| 7 days | 3260 | 540 | 3140 | 540 | 3220 | 490 |
| 10 days | 2815 | 450 | 2775 | 500 | 2760 | 440 |
| 14 days | 2580 | 430 | 2580 | 460 | 2580 | 420 |
| 21 days | 2220 | 360 | 2200 | 390 | 1935 | 310 |
| Oxygen bomb | 1830 | 490 | 1740 | 590 | 1770 | 450 |

The foregoing examples serve to indicate the manner in which the invention may be carried out. The invention, however, is not restricted to such specific examples, as many modifications can be made by one skilled in the art.

In general, the most beneficial effect is obtained by using 0.75% to 1.5% of the antioxidant agent in the rubber compound (based on the rubber content) but lesser or greater quantities may be used, depending on the purpose at hand. In general, and up to a certain point, the durability of the rubber goods is a function of the quantity of the material employed.

The materials listed above possess little or no accelerating properties and may be introduced directly into the rubber stock without materially disturbing the factory rate of cure. Those which have slight accelerating properties, either alone or in conjunction with the accelerator employed in the stock, may be added directly to the rubber stock and the accelerator content adjusted so that the rate of cure remains the same.

It has also been found possible to add the material after the rubber stock has been vulcanized and still obtain appreciable improvement in the aging qualities of the stock. This may be done by painting or dipping the rubber stock with a solution of the desired material and after allowing penetration to take place, to dry off the surplus solvent.

What I claim is:—

1. A rubber composition including an aldehyde reaction product of a BB′ diamino di ethyl ether.

2. A rubber composition including an aldehyde reaction product of a BB′ diamino di ethyl ether in which one of the hydrogen atoms of each amino group is replaced by an aryl hydrocarbon residue.

3. A rubber composition including an aldehyde reaction product of a BB′ diamino di ethyl ether in which one of the hydrogen atoms of each amino group is replaced by an alkyl hydrocarbon residue.

4. A rubber composition including an aldehyde reaction product of a BB′ diamino di ethyl ether in which one of the hydrogen atoms of one amine group is replaced by an aryl hydrocarbon residue and one of the hydrogen atoms of the other amino group is replaced by an alkyl hydrocarbon residue.

5. A rubber composition including an aldehyde reaction product of a BB′ diamino di ethyl ether in which each nitrogen atom is attached to an alkyl and an aryl hydrocarbon residue.

6. A rubber composition including an aldehyde reaction product of a diaryl substituted BB′ diamino di ethyl ether.

7. A rubber composition including an aldehyde reaction product of a dialkyl substituted BB′ diamino di ethyl ether.

8. A rubber composition including an aldehyde reaction product of the material obtained by heating one mol of BB′ dichlor di ethyl ether with at least two mols of a compound containing a primary amino group.

9. A rubber composition including an aldehyde reaction product of the material from which morpholine derivatives have been removed obtained by heating one mol of BB′ dichlor di ethyl ether with at least two mols of a compound containing a primary amino group.

10. A rubber composition including an aldehyde reaction product of the material obtained by heating one mol of BB′ dichlor di ethyl ether with at least two mols of a primary aromatic amine.

11. A rubber composition including an aldehyde reaction product of the material from which morpholine derivatives have been removed, obtained by heating one mol of BB′ dichlor di ethyl ether with at least two mols of a primary aromatic amine.

12. A rubber composition including an aldehyde reaction product of the material obtained by heating one mol of BB′ dichlor di ethyl ether with at least two mols of a secondary aromatic amine.

13. A rubber composition including an aldehyde reaction product of the material from which morpholine derivatives have been removed, obtained by heating one mol of BB′ dichlor di ethyl ether with at least two mols of a secondary aromatic amine.

14. A rubber composition including butylidene BB′ di (phenyl amino) di ethyl ether.

15. A rubber composition including an aldehyde reaction product of the material obtained by heating one mol of BB′ dichlor di ethyl ether with at least two mols of aniline.

16. A rubber composition including the butylaldehyde reaction product of the material obtained by heating one mol of BB′ dichlor di ethyl ether with at least two mols of aniline.

17. A rubber composition including an aldehyde reaction product of the material, from which N-phenyl morpholine has been removed, obtained by heating one mol of BB′ dichlor di ethyl ether with at least two mols of aniline.

18. A rubber composition including an organic material of the constitution:

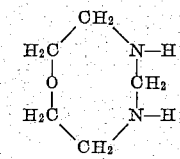

wherein the hydrogen atoms attached to the nitrogen atoms may be replaced by alkyl, aryl and alkyl-aryl radicals and one of the hydrogen atoms attached to the carbon atom, which is attached to both nitrogen atoms, may be replaced by alkyl, aryl and alkyl-aryl radicals.

19. A process for inhibiting oxidation of rubber, or a rubber-like compound which comprises combining with said material a substance having a characteristic group as follows:
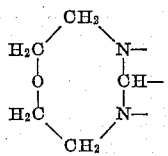
In testimony whereof, I affix my signature.
HAROLD A. MORTON.

Certificate of Correction

Patent No. 1,847,974.                                                      Granted March 1, 1932, to

HAROLD A. MORTON

It is hereby certified that error appears in the printed specification of the above numbered patent requiring correction as follows: Page 3, strike out the boxed table of headings between lines 20 and 25, and insert instead the following—

| Days in oven at 70° C. | Compound—A—<br>Without Antioxidant | | Compound—B—<br>1.5% Antioxidant | |
|---|---|---|---|---|
| | Tensil | Elongation | Tensil | Elongation | and that the said Letters Patent should be read with this correction therein that the same may conform to the record of the case in the Patent Office.

This certificate supersedes Certificate of Correction issued May 10, 1932.

Signed and sealed this 7th day of June, A. D. 1932.

[SEAL.]                                                                               M. J. MOORE,
*Acting Commissioner of Patents.*